(12) United States Patent
Liu et al.

(10) Patent No.: US 7,873,145 B2
(45) Date of Patent: Jan. 18, 2011

(54) WIRELESS DIGITAL IMAGE DETECTOR

(75) Inventors: James Zhengshe Liu, Glenview, IL (US); Chuande Liu, Waukesha, WI (US); Donald F. Langler, Brookfield, WI (US); Feng Gao, Naperville, IL (US); Scott William Petrick, Sussez, WI (US); Gary V. McBroom, Dousman, WI (US)

(73) Assignee: General Electric Company, Schenectady, NY (US)

( * ) Notice: Subject to any disclaimer, the term of this patent is extended or adjusted under 35 U.S.C. 154(b) by 3 days.

(21) Appl. No.: 12/414,848

(22) Filed: Mar. 31, 2009

(65) Prior Publication Data

US 2010/0246757 A1 Sep. 30, 2010

(51) Int. Cl.
*H05G 1/64* (2006.01)
(52) U.S. Cl. ..................................... 378/98.8
(58) Field of Classification Search ................. 378/19, 378/98.8; 455/423; 345/156
See application file for complete search history.

(56) References Cited

U.S. PATENT DOCUMENTS

| 7,593,507 B2 * | 9/2009 | Ohta et al. ................. 378/98.8 |
| 2007/0272873 A1 * | 11/2007 | Jadrich et al. .......... 250/370.11 |
| 2009/0116431 A1 * | 5/2009 | Cadieux ..................... 370/329 |

OTHER PUBLICATIONS

Thales Components & Subsystems, "Pixium Portable 3543," Mar. 2008, Velizy Cedex, France.
Liu, James Zhengshe et al.; U.S. Appl. No. 12/403,551, filed Mar. 13, 2009; "Digital Image Detector with Removable Battery".

* cited by examiner

*Primary Examiner*—Irakli Kiknadze
(74) *Attorney, Agent, or Firm*—Fletcher Yoder P.C.

(57) ABSTRACT

A digital detector of a digital imaging system is provided. In one embodiment, the digital detector includes a flat-panel detector having a detector array for converting X-ray radiation into image data. The digital detector may also include a plurality of antennas, and the digital detector may be configured to transmit the image data via one or more antennas of the plurality of antennas. Additional systems, methods, and devices are also disclosed.

21 Claims, 8 Drawing Sheets

WIRELESS DIGITAL IMAGE DETECTOR

BACKGROUND

The present disclosure generally relates to digital imaging systems, and particularly to a portable digital detector of such systems.

A number of radiological imaging systems of various designs are known and are presently in use. Such systems generally are based upon generation of X-rays that are directed toward a subject of interest. The X-rays traverse the subject and impact a film or a digital detector. In medical diagnostic contexts, for example, such systems may be used to visualize internal tissues and diagnose patient ailments. In other contexts, parts, baggage, parcels, and other subjects may be imaged to assess their contents and for other purposes.

Increasingly, such X-ray systems use digital circuitry, such as solid-state detectors, for detecting the X-rays, which are attenuated, scattered or absorbed by the intervening structures of the subject. As will be appreciated, solid-state detectors may generate electrical signals indicative of the intensities of received X-rays. These signals, in turn, may be acquired and processed to reconstruct images of the subject of interest.

To provide greater versatility, some digital detectors are configured as portable devices, in contrast to others that are fixed at a particular location, such as in a table or a wall stand. In some applications, portable digital detectors may receive power and communicate data via a cable or tether that connects the portable digital detector to other components of an imaging system, such as a computer or image processor. While such a tethered arrangement may provide somewhat increased flexibility in the positioning of the detector, the tether may in some cases interfere with the desired positioning and operation of the detector. In other instances, wireless digital detectors may be used. While these wireless detectors may not require a tether for operating power or communication, wireless communication between such a detector and other components of an X-ray system may be negatively impacted by interference with other wireless devices, objects positioned between the detector and another component of the imaging system with which it is attempting to communicate, and by other factors.

BRIEF DESCRIPTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Some embodiments of the present invention may generally relate to imaging systems, and to digital detectors for such imaging systems. In one embodiment, a digital detector configured for use with an imaging system includes a detector array capable of converting received X-rays into electronic signals representative of an object of interest, such as tissue of a patient. The digital detector may also include multiple antennas for wirelessly communicating data between the digital detector and the imaging system, which may also include multiple antennas. Data may be communicated between a single pair of antennas, such as from a transmitting antenna of the digital detector to a receiving antenna elsewhere within the imaging system, or may be communicated over multiple data channels between multiple antenna pairs. The digital detector may communicate in accordance with any suitable wireless communication standard, such as an ultra wideband communication standard.

Various refinements of the features noted above may exist in relation to various aspects of the present invention. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of the present invention without limitation to the claimed subject matter.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, while the term "exemplary" may be used herein in connection to certain examples of aspects or embodiments of the presently disclosed technique, it will be appreciated that these examples are illustrative in nature and that the term "exemplary" is not used herein to denote any preference or requirement with respect to a disclosed aspect or embodiment. Further, any use of the terms "top," "bottom," "above," "below," other positional terms, and variations of these terms is made for convenience, but does not require any particular orientation of the described components.

Figure 1:
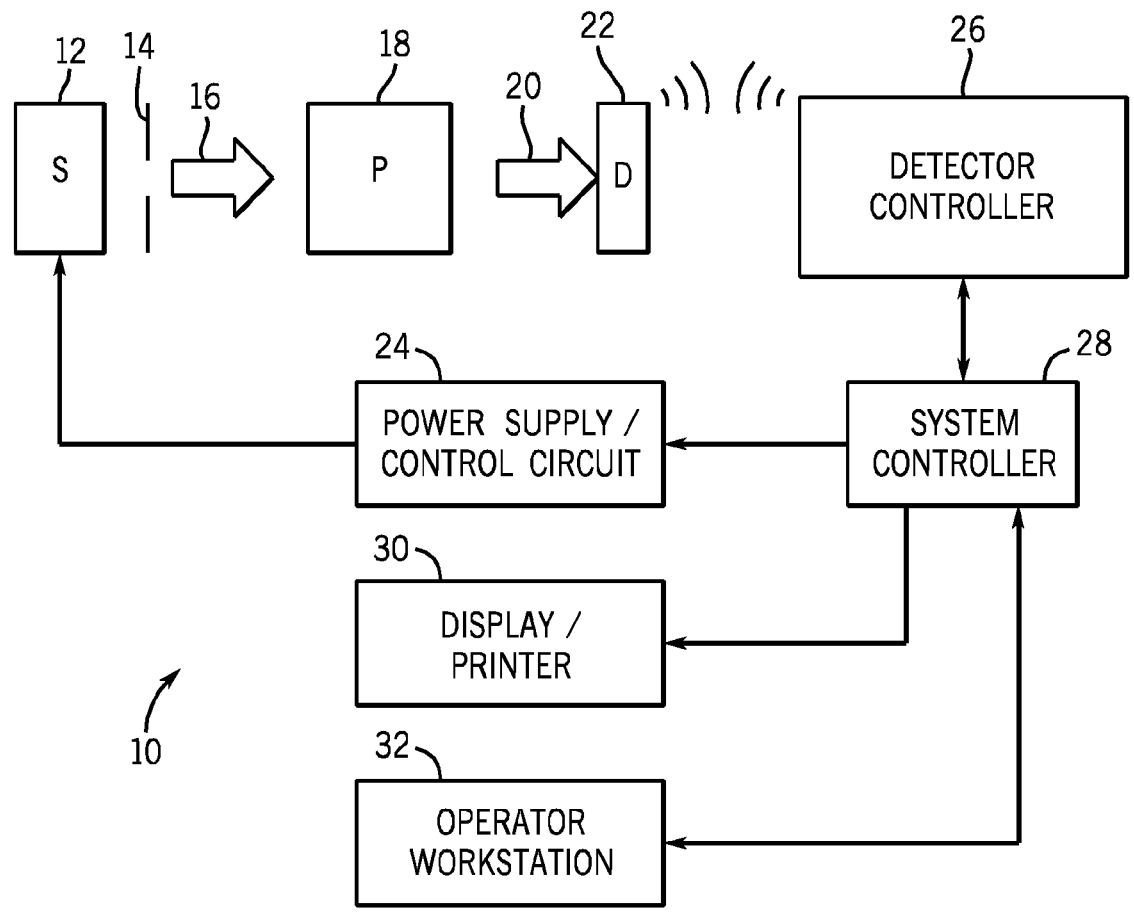
FIG. 1 is a diagrammatical overview of a digital X-ray imaging system of one embodiment in which the present technique may be utilized.

Turning now to the drawings, FIG. 1 illustrates diagrammatically an imaging system 10 for acquiring and processing discrete pixel image data. In the illustrated embodiment, the imaging system 10 is a digital X-ray system designed both to acquire original image data and to process the image data for display in accordance with the present technique. In the embodiment illustrated in FIG. 1, imaging system 10 includes a source of X-ray radiation 12 positioned adjacent to a collimator 14. The collimator 14 permits a stream of radiation 16 to pass into a region in which an object or subject, such as a patient 18, is positioned. A portion of the radiation 20 passes through or around the subject and impacts a digital X-ray detector, represented generally at reference numeral 22. As will be appreciated by those skilled in the art, the detector 22 may convert the X-ray photons received on its surface to lower energy photons, and subsequently to electric signals, which are acquired and processed to reconstruct an image of the features within the subject.

The radiation source 12 is controlled by a power supply/control circuit 24 which supplies both power and control signals for examination sequences. Moreover, the detector 22 is communicatively coupled to a detector controller 26 which commands acquisition of the signals generated in the detector 22. In the presently illustrated embodiment, the detector 22 may communicate with the detector controller 26 via any suitable wireless communication standard, although the use of detectors 22 that communicate with the detector controller 26 through a cable or some other mechanical connection are also envisaged. The detector controller 26 may also execute various signal processing and filtration functions, such as for initial adjustment of dynamic ranges, interleaving of digital image data, and so forth.

Both the power supply/control circuit 24 and the detector controller 26 are responsive to signals from a system controller 28. In general, the system controller 28 commands operation of the imaging system to execute examination protocols and to process acquired image data. In the present context, the system controller 28 also includes signal processing circuitry, typically based upon a programmed general purpose or application-specific digital computer; and associated manufactures, such as optical memory devices, magnetic memory devices, or solid-state memory devices, for storing programs and routines executed by a processor of the computer to carry out various functionalities, as well as for storing configuration parameters and image data; interface circuits; and so forth.

In the embodiment illustrated in FIG. 1, the system controller 28 is linked to at least one output device, such as a display or printer as indicated at reference numeral 30. The output device may include standard or special purpose computer monitors and associated processing circuitry. One or more operator workstations 32 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

Figure 2:
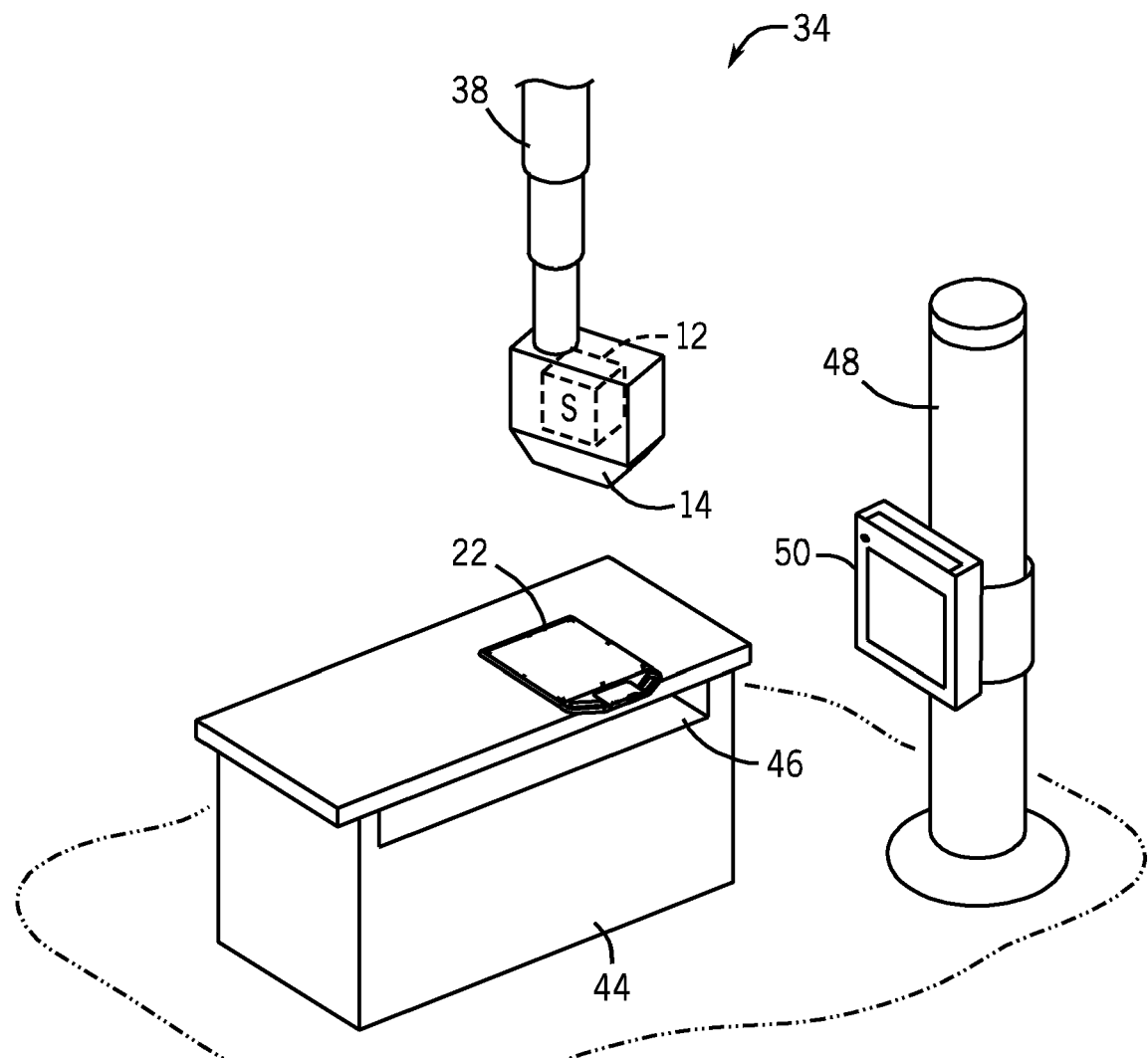
FIG. 2 is a partial perspective view of the digital X-ray imaging system of FIG. 1 in accordance with one embodiment.

By way of further example, a partial perspective view of an imaging system 34 is provided in FIG. 2 in accordance with one embodiment. The imaging system 34 includes an overhead tube support arm 38 for positioning a radiation source 12, such as an X-ray tube, and a collimator 14 with respect to a patient 18 and a digital flat-panel detector 22. It is additionally noted that the imaging system 34 may also include any or all of the other components described above with respect to FIG. 1, such as the system controller 28.

Moreover, in one embodiment, the imaging system 34 may be used in consort with one or both of a patient table 44 and a wall stand 48 to facilitate image acquisition. Particularly, the table 44 and the wall stand 48 may be configured to receive one or more digital detectors 22. For instance, a digital detector 22 may be placed on the upper surface of the table 44, and the patient 18 (more specifically, an anatomy of interest of the patient 18) may be positioned on the table 44 between the detector 22 and the radiation source 12. In some other instances, the detector 22 may be positioned in a slot 46 below the upper surface of the table 44 and the patient 18, or the radiation source 12 and the detector 22 may be positioned horizontally about the patient 18 for cross-table imaging. Further, the wall stand 48 may include a receiving structure 50 also adapted to receive the digital detector 22, and the patient 18 may be positioned adjacent the wall stand 48 to enable image data to be acquired via the digital detector 22.

In one embodiment, the imaging system 34 may be a stationary system disposed in a fixed X-ray imaging room, such as that generally depicted in, and described above with respect to, FIG. 2. It will be appreciated, however, that the presently disclosed techniques may also be employed with other imaging systems, including mobile X-ray units and systems, in other embodiments. For instance, in other embodiments, such as that described below with respect to FIG. 8, a mobile X-ray unit may be moved to a patient recovery room, an emergency room, a surgical room, or the like to enable imaging of a patient without requiring transport of the patient to a dedicated (i.e., fixed) X-ray imaging room.

Figure 3:
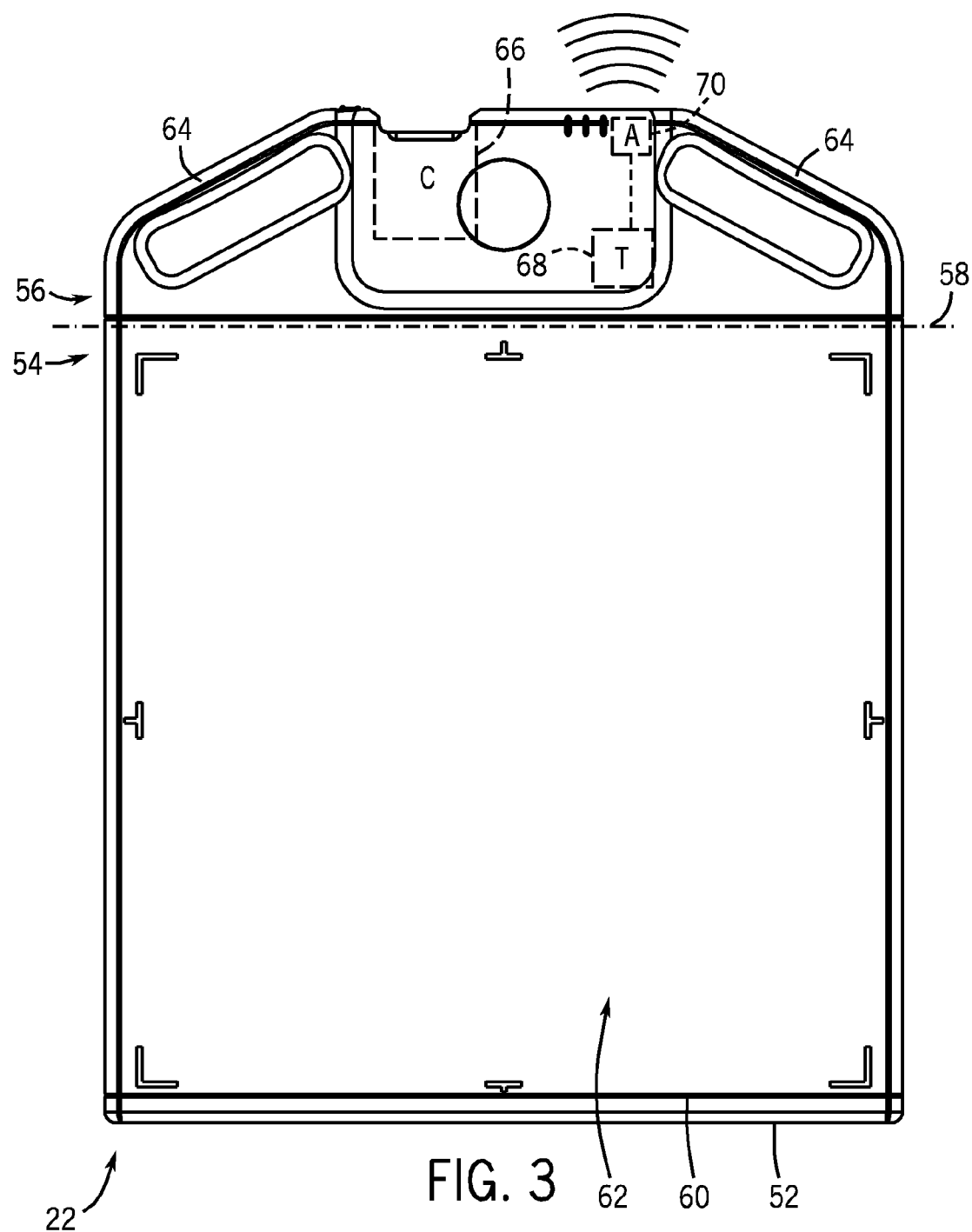
FIG. 3 is an elevational view generally depicting certain features of one embodiment of a digital detector that may be used to acquire image data regarding a patient or object of interest.

One example of a digital detector 22 is generally illustrated in FIG. 3 in accordance with one embodiment. In this presently depicted embodiment, the detector 22 includes a housing 52 that encloses various components of the detector 22. The housing 52 may include a radiation detecting portion or region 54 and a handling portion or region 56, as generally depicted on alternative sides of the dashed line 58. The radiation detecting portion 54 of the housing 52 may include a window 60 that exposes a solid-state detector array 62. The detector array 62 may be configured to receive electromagnetic radiation, such as from the radiation source 12, and to convert the radiation into electrical signals that may be interpreted by the imaging system 34 to output an image of an object or patient 18. The handling portion 56 of the housing 52 may, in turn, include various features that facilitate handling of the detector 22 by a technician or other user. In some embodiments, such as that depicted in FIG. 3., this portion of the detector 22 may include one or more handles 64, although it is noted that other features, such as contours allowing a user to more easily grip the detector 22, may also or instead be included in other embodiments.

Operating power may be provided to the digital detector 22 in any suitable manner. For example, in one embodiment, the detector 22 may include a power connector 66 configured to engage either of a removable battery or a cable (e.g., a tether), as described in greater detail in co-pending U.S. patent application Ser. No. 12/403,551, filed Mar. 13, 2009, and entitled "Digital Image Detector with Removable Battery," which is hereby incorporated by reference in its entirety. In one embodiment, the connector 66 may generally include a receptacle for receiving either the removable battery or the tether and may include electrical contacts to route power from the battery or from an external power source via the tether to the various components of the digital detector 22. In other embodiments, a fixed internal battery or other alternative power sources may be used in full accordance with the present techniques.

The digital detector 22, in one embodiment, includes a transmitter 68 and an antenna 70 that cooperate to wirelessly transmit image data to other components of the imaging system, such as the detector controller 26 and the system controller 28. In various embodiments, the transmitter 68 may be configured as a one-way communication device that transmits data from the detector 22 via the antenna 70, or may be configured as a two-way communication device (e.g., a radio transceiver) capable of both transmitting and receiving data via the antenna 70. The transmitter 68 may utilize any suitable wireless communication protocol, such as an ultra wideband (UWB) communication standard (e.g., direct sequence UWB or multi-band orthogonal frequency division multiplexing UWB). In such an embodiment, communication via a UWB standard may reduce interference with other devices and wireless communications. In other embodiments, however, the transmitter 68 may use a Bluetooth communication standard, any 802.11 communication standard, or some other wireless communication standard. In some embodiments, the detector 22 may also be configured to enable communication over a wired connection, such as via a tether coupled to the detector 22. Additionally, any suitable antenna may be employed, such as a small-size chip antenna (with or without a built-in amplifier), an on-board omni-directional antenna, and so forth.

During a patient image acquisition process, tissue of the patient 18 will generally be disposed over the detector array 62 such that radiation from the radiation source 12 passes through the patient tissue and impinges the detector array 62. The imaged patient tissue may, in some instances, cover a substantial portion of the detecting portion 54 of the detector 22. In many such instances however, patient tissue may not cover some or all of the handling portion or region 56. Consequently, in one embodiment, the antenna 70 may be disposed within the handling portion 56, rather than the radiation detecting portion 54, to reduce the probability that the imaged patient tissue will cover an area of the housing 52 over the antenna 70 and interfere with wireless communication between the digital detector 22 and other components of the imaging system 34.

Figure 4:
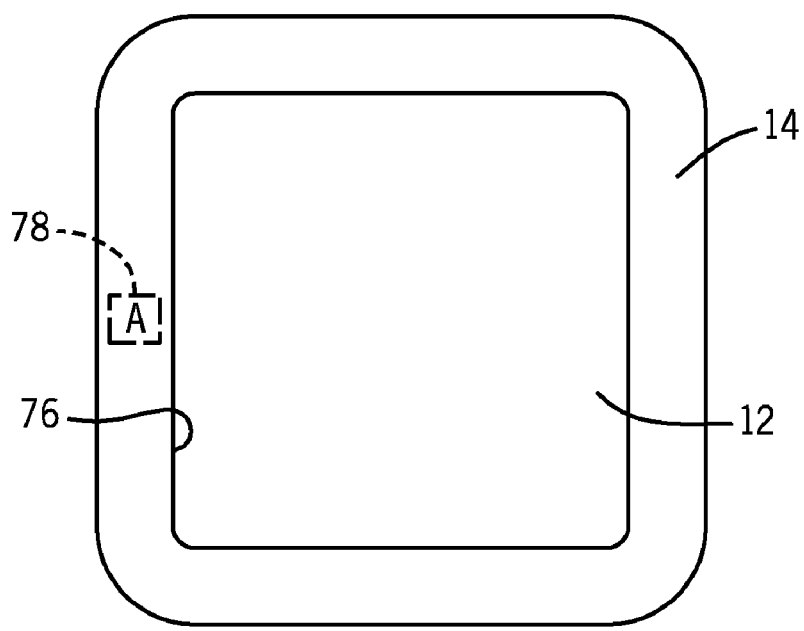
FIG. 4 is a bottom plan view of a collimator of the digital X-ray imaging system of FIG. 2, in which the collimator includes an antenna capable of receiving wireless data transmissions from a digital detector, in accordance with one embodiment.

It will be appreciated that the imaging system 34 may also include components, such as any suitable antenna and receiver, capable of receiving wireless communications from the digital detector 22. As generally noted above with respect to the transmitter 68, such a receiver may include a one-way communication device for receiving communications from the digital detector 22, or may be configured as a two-way transceiver for both receiving data from, and transmitting data to, the detector 22. In some embodiments, the imaging system 34 may receive data from the digital detector 22 by way of an antenna 78 disposed at the collimator 14, as generally illustrated in FIG. 4. As noted above, the collimator 14 is generally positioned between the radiation source 12 and the patient 18 (or other object to be imaged), and defines a window 76 through which radiation from the radiation source 12 may be emitted toward the patient 18. As the signal strength of a communication channel between two antennas generally decreases as the distance between the two antennas increases, the provision of the antenna 78 at the collimator 14 may increase the signal strength of the communication channel by minimizing the distance between the antenna 70 of the detector 22 and the antenna 78. In such an embodiment, the receiver associated with the antenna 78 may also be included at or near the collimator 14, or may be provided elsewhere within the imaging system 34.

Figure 7:
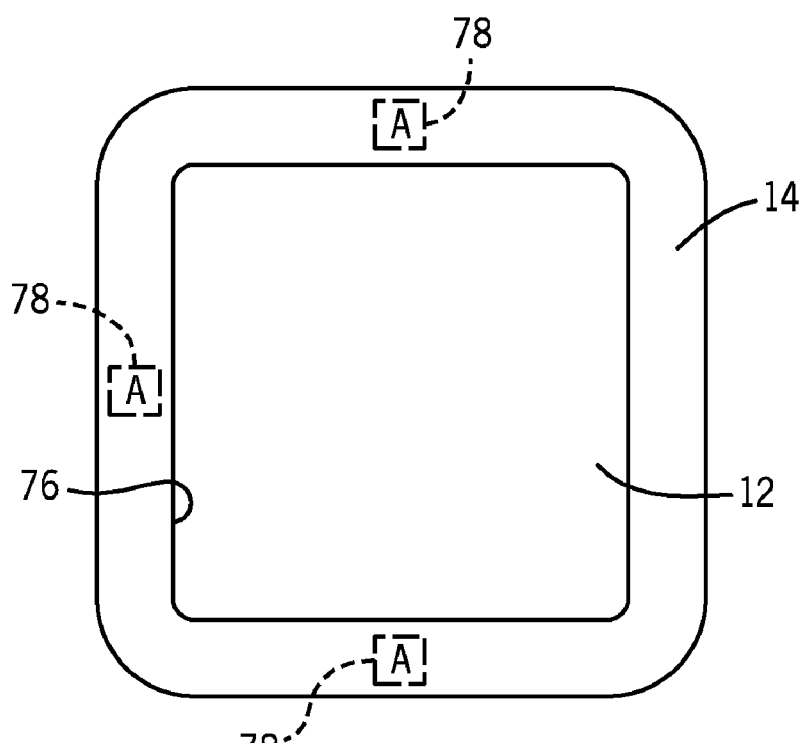
FIG. 7 is a bottom plan view of a collimator of the digital X-ray imaging system of FIG. 2, in which the collimator includes multiple antennas for communication with the digital detector in accordance with one embodiment.
Figure 5:
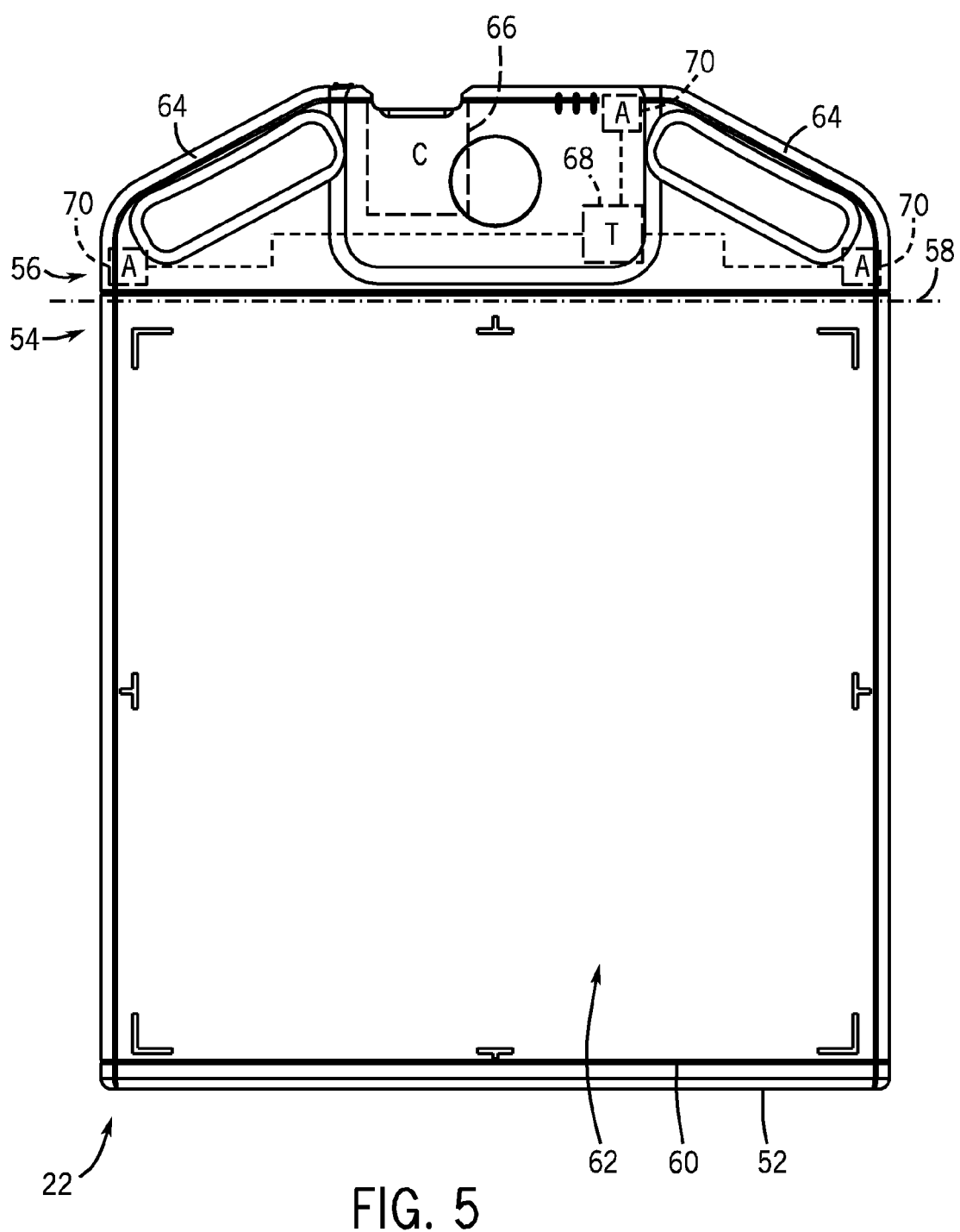
FIG. 5 is an elevational view of a digital detector having multiple antennas in a handle portion of the digital detector in accordance with one embodiment.
Figure 6:
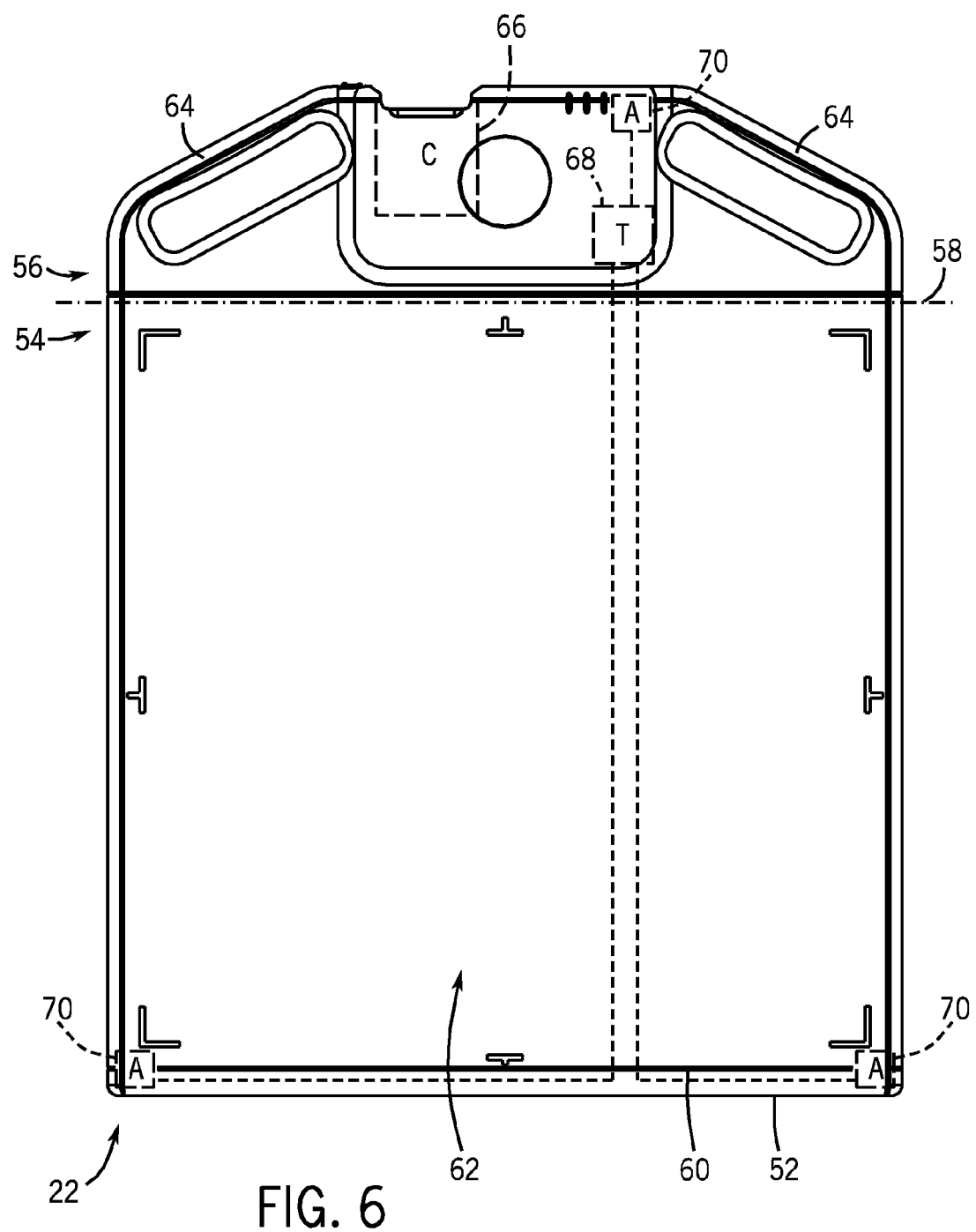
FIG. 6 is an elevational view of another digital detector embodiment having multiple antennas disposed in other locations than those of the detector illustrated in FIG. 5.

It is further noted that the reliability of wireless communication from the detector 22 may be directly impacted by the signal strength of the communication channel. As such, in contrast to the single-antenna embodiment described above, other embodiments may include multiple antennas within the digital detector 22 and/or other components of the imaging system 34. For instance, as generally illustrated in FIG. 5 in accordance with one embodiment, the digital detector 22 may include three antennas 70, each capable of communicating the image data acquired via the detector array 62. In presently illustrated embodiment, each antenna 70 operates under the control of a single transmitter 68, although it is noted that other embodiments may employ multiple transmitters 68, and may include one transmitter 68 for each antenna 70. Moreover, transmitter-antenna pairs may be integrated into a single chip, or may be provided separate from one another. In FIG. 5, each of the antennas 70 is disposed in the handling portion 56. More particularly, one of the antennas 70 is provided at an upper edge of the housing 52, while the other two antennas 70 are disposed at opposite sides, and in opposite corners, of the housing 52. In other embodiments, however, such as that illustrated in FIG. 6, some or all of the antennas 70 may be located within the radiation detecting portion 54. Still further, multiple antennas 78 may be included in the system 34, such as at the collimator 14, as generally depicted in FIG. 7 in accordance with one embodiment. Although several particular embodiments have been discussed above by way of example, it is noted that the present techniques are not limited to those particular embodiments. Particularly, the number and placement of the one or more antennas 70 with respect to the housing 52, and the one or more antennas 78 with respect to various components of the imaging system 34, may be varied in any desired manner in accordance with the present techniques.

Figure 8:
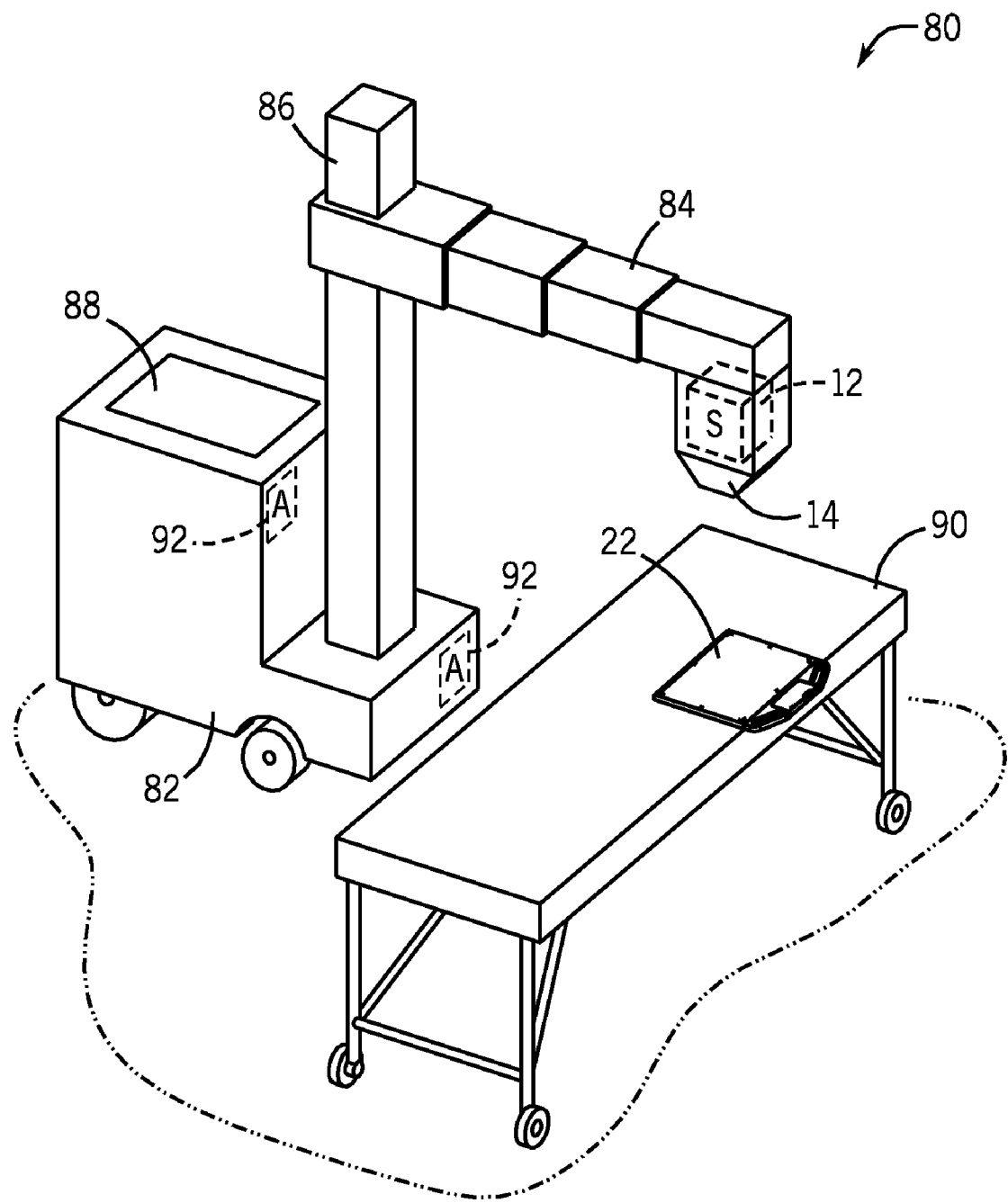
FIG. 8 is a perspective view of a mobile X-ray unit having one or more antennas for communicating with a digital detector in accordance with one embodiment.

As noted above, the present techniques may also be employed with respect to a mobile X-ray imaging system 80, such as that depicted in FIG. 8 in accordance with one embodiment. The imaging system 80 may include a mobile X-ray unit 82, such as a Definium™ AMX 700 mobile X-ray system available from General Electric Healthcare of Waukesha, Wis. It will be appreciated, however, that the presently disclosed techniques may also be employed with other mobile imaging systems, or stationary X-ray units and systems (as discussed above), in other embodiments. In one embodiment, a support arm 84 may be vertically moved along a support column 86 to facilitate positioning of the radiation source 12 with respect to a patient 18. Further, one or both of the support arm 84 and support column 86 may also be configured to allow rotation of the radiation source 12 about an axis. The mobile X-ray unit 82 may also include a user interface 88, such as a display screen, buttons, switches, or the like. It is noted that various components of the system 10 (FIG. 1) may be disposed within the mobile unit 82. For instance, the system controller 28 may be disposed within the portable unit 82, and operation of the imaging system 80 may be facilitated via the user interface 88.

The mobile X-ray unit 82 may be positioned adjacent a bed 90 of the patient 18 to enable medical images to be obtained without necessitating movement of the patient to a dedicated imaging room. The mobile X-ray unit 82 may include a collimator 14 having one or more antennas 78, as discussed above with respect to FIGS. 4 and 7. In some instances, however, such as those in which a large patient 18 covers both the radiation detecting portion 54 and the handling portion 56 of the detector 22, the strongest signal communication path between the digital detector 22 and the rest of the imaging system 34 may be through the patient bed 90 (rather than through the tissue of the patient 18). Accordingly, the mobile unit 82 may also, or instead, include one or more antennas 92 on sides of the mobile cart, next to the bed 90, for receiving image data transmitted from the digital detector 22.

Figure 9:
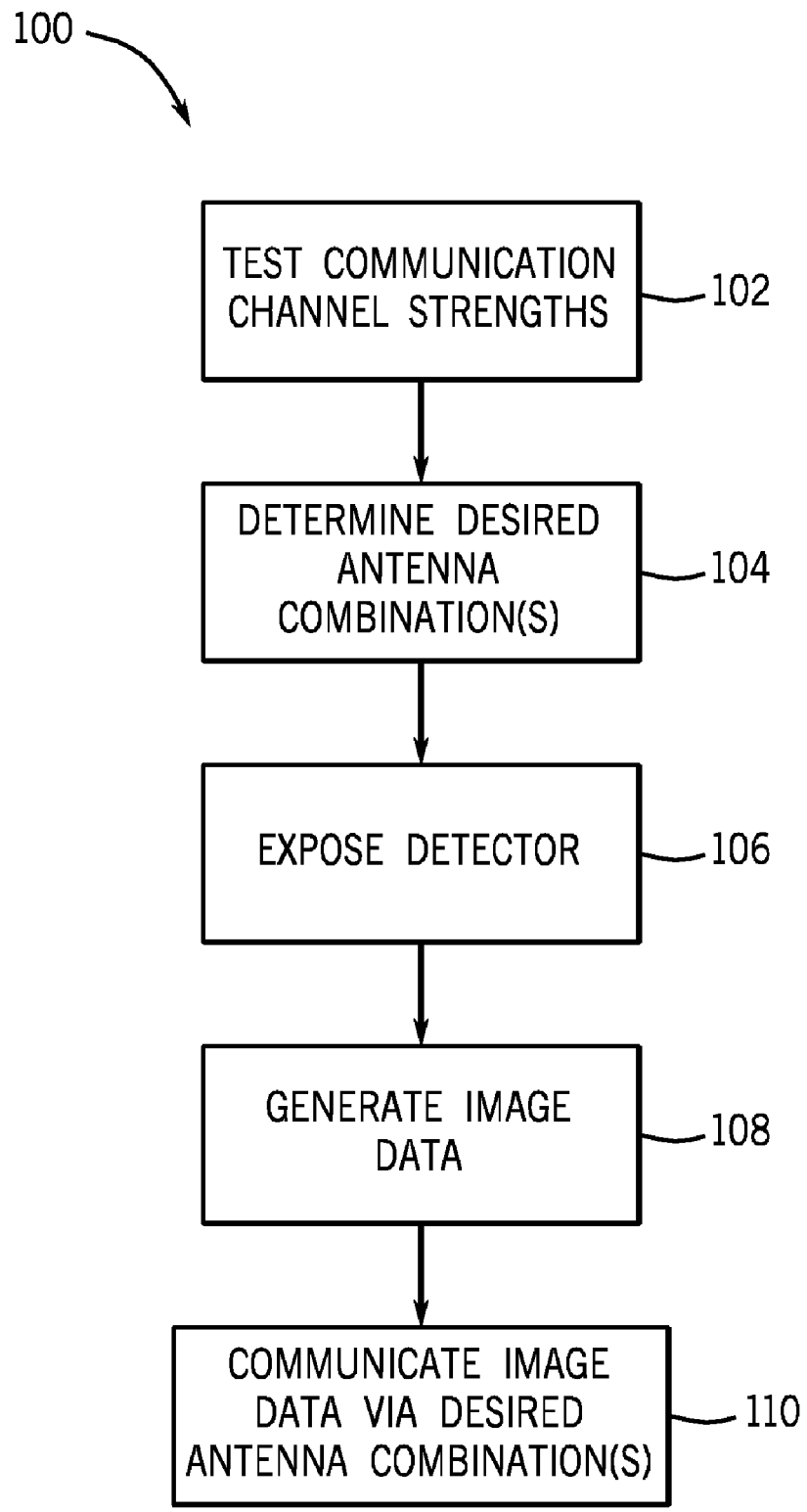
FIG. 9 is a flowchart of a method of operating an imaging system to acquire image data via a digital detector and to communicate such data from the detector in accordance with one embodiment.

A method 100 for acquiring image data is generally depicted in FIG. 9 in accordance with one embodiment. The method 100 may include testing the strength of various communication channels between combinations of transmitting and receiving antennas (e.g., between the one or more antennas 70 of the detector 22 on the one hand, and the antennas 78 and/or 92 on the other), as generally depicted in block 102. The method 100 may also include determining and selecting one or more desired communication paths or antenna combinations, as generally depicted block 104.

It is noted that the distance between antennas 70 of the detector 22 and antennas 78 and/or 92 of an X-ray system may vary from exam to exam, or even within a single examination, due to movement of the detector 22, the collimator 14, or other components of the system. As a result, the phase and intensity of communication signals between such antennas may also vary. Accordingly, in one embodiment, the testing and determination of antenna combinations may generally include the initiation of a probing signal before image acquisition commences to determine the best combination of coefficients for communicating over multiple data channels between the various antennas. In another embodiment, such a probing signal may be used to determine the combination of the transmitting antenna and the receiving antenna to determine a single, most-desirable antenna pair (e.g., the pair with the greatest signal strength intensity) for communication of data over a single data channel. Accordingly, in various embodiments, transmission of the acquired image data from detector 22 may be accomplished via multiple channels between antennas of the imaging system and detector, or may be accomplished through a single pair of transmitting and receiving antennas. Following the determination of the one or more desired antenna combinations, the detector 22 may be exposed and image data may be generated, as generally depicted in blocks 106 and 108. The acquired image data may then be communicated via the one or more desired antenna combinations, as generally depicted in block 110.

Technical effects of the invention include the ability to communicate data between a digital detector and other components of an imaging system over multiple data channels. Further, the present techniques allow for increased data throughput and reliability of wireless communication of image data from a digital detector. Still further, the use of a UWB detector may reduce the likelihood of communication interference with other wireless devices.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An imaging system comprising:
   a digital flat-panel detector including:
      a detector array configured to convert X-ray radiation into image data; and
      a plurality of antennas, wherein the digital flat-panel detector is configured to transmit the image data via one or more antennas of the plurality of antennas;
   system control circuitry configured to control exposure of the digital flat-panel detector by the radiation source and to acquire image data from the digital detector; and
   a plurality of additional antennas independent of the digital flat-panel detector;
   wherein the system control circuitry is configured to determine the signal strength of multiple, respective communication paths between the antennas of the digital flat-panel detector and the additional antennas independent of the digital flat-panel detector, to select one or more of the communication paths, and to acquire the image data via the one or more selected communication paths.

2. The imaging system of claim 1, comprising a radiation source.

3. The imaging system of claim 1, wherein the plurality of antennas includes at least two antennas disposed adjacent opposite ends of the digital flat-panel detector.

4. An imaging system comprising:
   a digital flat-panel detector including:
      a detector array configured to convert X-ray radiation into image data; and
      a plurality of antennas, wherein the digital flat-panel detector is configured to transmit the image data via one or more antennas of the plurality of antennas, wherein the plurality of antennas includes at least two antennas disposed adjacent opposite ends of the digital flat-panel detector;
   system control circuitry configured to control exposure of the digital flat-panel detector by the radiation source and to acquire image data from the digital detector; and
   an additional antenna independent of the digital flat-panel detector, wherein the system control circuitry is configured to acquire the image data via the additional antenna.

5. The imaging system of claim 4, comprising a mobile X-ray unit including the radiation source, the system control circuitry, and the additional antenna.

6. The imaging system of claim 4, comprising a collimator including the additional antenna.

7. The imaging system of claim 4, comprising a radiation source.

8. An imaging system comprising:
   a digital flat-panel detector including:
      a detector array configured to convert X-ray radiation into image data; and a plurality of antennas, wherein the digital flat-panel detector is configured to transmit the image data via one or more antennas of the plurality of antennas, wherein the digital flat-panel detector includes an image acquisition region configured to convert X-ray radiation into image data and a handle region configured to facilitate positioning of the digital flat-panel detector by a user, and wherein each antenna of the plurality of antennas is disposed within the handle region.

9. The imaging system of claim 8, comprising:
a radiation source; and
system control circuitry configured to control exposure of the digital flat-panel detector by the radiation source and to acquire image data from the digital detector.

10. The imaging system of claim 9, comprising an additional antenna independent of the digital flat-panel detector, wherein the system control circuitry is configured to acquire the image data via the additional antenna.

11. The imaging system of claim 10, comprising a mobile X-ray unit including the radiation source, the system control circuitry, and the additional antenna.

12. The imaging system of claim 10, comprising a collimator including the additional antenna.

13. The imaging system of claim 9, comprising a plurality of additional antennas independent of the digital flat-panel detector.

14. The imaging system of claim 13, wherein the system control circuitry is configured to determine the signal strength of multiple, respective communication paths between the antennas of the digital flat-panel detector and the additional antennas independent of the digital flat-panel detector, to select one or more of the communication paths, and to acquire the image data via the one or more selected communication paths.

15. An imaging system comprising:
a digital flat-panel detector including:
a detector array configured to convert X-ray radiation into image data; and
a plurality of antennas, wherein the digital flat-panel detector is configured to transmit the image data via one or more antennas of the plurality of antennas;
wherein the digital flat-panel detector includes a housing having a plurality of corners, and wherein the plurality of antennas includes at least two antennas disposed in different corners of the housing.

16. The imaging system of claim 15, wherein the plurality of antennas includes at least two antennas disposed adjacent opposite ends of the digital flat-panel detector.

17. A method comprising:
testing each of a plurality of wireless data communication channels between one or more antennas of a digital detector and one or more additional antennas of a medical imaging system;
selecting at least one wireless data communication channel of the plurality of wireless data communication channels based on the testing;
exposing the digital detector of the medical imaging system to radiation, the digital detector configured to generate electronic image data based on the received radiation; and
receiving the electronic image data from the digital detector via the at least one selected wireless data communication channel.

18. The method of claim 17, wherein selecting at least one wireless data communication channel comprises selecting a single wireless data communication channel.

19. The method of claim 17, wherein testing each of a plurality of wireless data communication channels includes determining a respective signal strength of each of the plurality of wireless data communication channels.

20. The method of claim 19, wherein selecting at least one wireless data communication channel comprises selecting a single wireless data communication channel having a signal strength greater than the remaining wireless data communication channels of the plurality of wireless data communication channels.

21. The method of claim 17, wherein selecting the at least one wireless data communication channel includes selecting multiple wireless data communication channels such that the combination of the selected multiple wireless data communication channels enables greater data throughput than any single wireless data communication channel of the plurality of wireless data communication channels.

* * * * *